3,210,207
NON-CORROSIVE ACCELERATOR FOR SETTING OF CEMENTS

Vance H. Dodson, Needham, Emery Farkas, Newtonville, and Arnold M. Rosenberg, Burlington, Mass., assignors to W. R. Grace & Co., Cambridge, Mass., a corporation of Connecticut
No Drawing. Filed Aug. 24, 1964, Ser. No. 391,755
16 Claims. (Cl. 106—90)

This is a continuation-in-part of our copending application Serial No. 245,386, filed December 18, 1962, and now forfeited.

This invention relates to cementitious compositions. In a particular aspect, it relates to additives for hydraulic cements which accelerate setting of cement and inhibit corrosion of steel in reinforced concrete.

Hydraulic cements are defined as those cements that are capable of setting and hardening by interacting water with the constituents of the cement. Portland cement represents a class of hydraulic cements and is comprised essentially of calcium silicate. A common Portland cement comprises $3CaO.SiO_2$ and $2CaO.SiO_2$, and a lesser amount of calcium aluminate, $3CaO.Al_2O_3$. Portland cements are produced by heating an intimate mixture of finely divided calcareous material (limestone) and argillaceous material (clay) to fusion to form a clinker. The clinker is pulverized with the addition of about 2% of gypsum, or some other form of calcium sulfate, to obtain desired setting qualities in the finished cement. Small amounts of other substances are sometimes added during grinding to impart special properties to the product. When mixed with water, Portland cement sets in a few hours and hardens over a period of weeks. The initial setting is caused by the interaction of water and the tricalcium aluminate and the later hardening and development of cohesive strength result from the interaction of water and the tricalcium silicate. Both interactions are accompanied by the separation of a gelatinous hydrated product believed to be gelatinous calcium silicate which, in each case, surrounds and cements the individual particles together. The dicalcium silicate hydrates at a rate more slowly than the other compounds.

Hydration of cement is a chemical change which is dependent on temperature. Since temperatures vary constantly, an effective means of controlling the hydration rate is essential to the production of quality concrete. This is particularly important in the preparation and use of concrete during the winter when accelerated hydration is required to develop early strength and prevent the damaging effects of extremely low temperature.

Early hydration may be obtained by means of external heating or by the addition of an accelerator to the concrete mix. External heating is expensive because of the equipment required and the actual generation process itself and it is not always feasible for on-the-job conditions. The most general practice is the addition of an accelerator into the mix. Carbonates, hydroxides and fluosilicates have been used as accelerators but have never gained widespread interest. Calcium chloride is generally used in this capacity because of its low cost and effectiveness.

The use of concrete in contact with metal, and particularly the advent of large-scale use of pre-stressed, post-stressed and reinforcing steel in structural concrete, gave rise to corrosion problems. While calcium chloride is quite effective in accelerating the setting of cement, it is used with reluctance, if at all, in applications where concrete is in contact with metal, such as in reinforced and pre-stressed concrete because it corrodes the steel which it contacts or which is embedded therein. The chloride ions exhibit corrosiveness toward steel in the presence of concrete if the quality of the concrete is low, if the steel is improperly embedded, or if the concrete is of the high slump variety. Corrosion is also known to result in the presence of calcium chloride if air or water gain access to the steel through porous concrete or through voids under the steel bars or cables.

It is, therefore, an object of this invention to provide a means for accelerating the setting of hydraulic cements without promoting corrosion of metal, especially steel, embedded therein. This objective is achieved by incorporating an additive in hydraulic cement mixes which is comprised of a major amount of calcium formate and a relatively minor amount of a selected class of compounds which inhibit corrosion in reinforced concrete. Calcium formate achieves early hydration of the cement and the corrosion inhibitor is believed to develop a coating around the steel which protects it against oxidative attack.

The effective inhibitors are those selected from the group consisting of benzoic acid and the alkali metal salts, alkaline earth metal salts and ammonium salts of chromic acid, benzoic acid, and nitrous acid. Illustrative compounds include sodium chromate, calcium chromate, barium chromate, ammonium chromate, sodium benzoate, lithium benzoate, calcium benzoate, magnesium benzoate, ammonium benzoate, and sodium nitrite. The use of benzoic acid is comparable to calcium benzoate in that the acid reacts with the calcium in the cement and forms calcium benzoate in situ. Sodium nitrite is particularly preferred as an inhibitor.

The additive is comprised of a minor amount of inhibitor with the balance comprised of sufficient calcium formate to bring the total of the additive to 100%. The inhibitor in the additive is employed in quantities which cover a wide range, and the particular amount is selected with due consideration to the degree of corrosion resistance desired in the concrete. The inhibitor is generally used in amounts ranging from about 2 to 20% by weight and preferably 2 to 15%. In a particularly preferred embodiment the inhibitor is used at about the 10% level. In another preferred embodiment the inhibitor is used in a level not in excess of 5%, preferably 2 to 4% and more preferably 2%.

Amounts of inhibitor at about the 10% level and higher in the additive compositions are preferably employed when the metal used in combination with the concrete is highly susceptible to corrosion. For example, in concretes used with metals such as prestressed steel, aluminum, and zinc, the higher levels of inhibitor in the additives are preferred.

The additive is used in the cement or concrete mix in amounts ranging between about 0.2% and 5% by weight based on the weight of the cement. At concentrations below 0.2% relatively minor set acceleration is noted. The preferred amount of additive is about 2% by weight based on the weight of cement. It should be understood that additive in amounts in excess of 5%, e.g., 10% and higher, may be used.

The invention is further illustrated by the following examples. In Examples 1 to 5, the compressive strength of concrete prepared from Portland cement is compared in three mixtures. One mixture had no additive; a second mixture contained 2 percent by weight of calcium chloride; a third mixture contained 2 percent by weight of an additive of this invention which consisted of 97.8% by weight of calcium formate and 2.2% by weight of sodium chromate.

The concrete used in Examples 1 to 5 was a non-air entrained mix made with 6 sacks of cement per cubic yard containing ¾ inch maximum size coarse aggregate and sand of 2.8 fineness modulus. The mixture was prepared in accordance with ACI 613–54 specifications for selecting proportions for concrete. All concrete was mixed at 73° F. and the slump was held at 2½±½ inch in all batches.

For the room temperature concrete (73° F.), 4 x 8 inch steel cylinder molds were used. The molds were filled with concrete, covered with wet burlap, and then stripped after 23 hours. The cylinders for the one-day test were capped with a sulfur compound and broken exactly at 24 hours. The cylinders for the three-day compression tests were placed in a room maintained at a constant temperature of 73° F. and at 99% relative humidity and kept there for two days. One hour before testing, specimens were removed from the moist room, capped and tested at 72 hours.

For the cold temperature concrete (40° F.), 4 x 8 inch cardboard cylinder molds were used. Immediately after the molds were filled with concrete, they were covered with iron plates and placed in a cabinet equipped with a thermostat and maintained at a temperature of 40° F. The molds were stripped after 23 hours. The cylinders for the one-day tests were capped and broken at 24 hours. The cylinders for the three-day compression tests were returned to the cold box immediately after the molds were stripped and kept there until one hour prior to testing. They were then capped and tested at 72 hours.

For the hot temperature concrete (180° F.), 4 x 8 inch metal cylinder molds were used. A high temperature resistant polyamide was used as a sealing compound between the mold and the base plate. Immediately after the molds were filled with concrete, they were covered with metal plates and placed in a hot room at a temperature of 180° F. The molds were stripped after 23 hours. The cylinders for the one-day tests were capped and tested at 24 hours. The specimens for the three-day compression tests were returned to the hot room immediately after the molds were stripped and kept there until one hour prior to testing. They were then capped and tested at 72 hours.

The results of these tests are reflected in the following tabulation.

containing no additive is included for comparative purposes in Table 2.

Table 1

| Hours | Compressive Strength, p.s.i. (average of 2 specimens) | |
|---|---|---|
| | Example 6 (1% additive) | Example 7 (1.5% additive) |
| 8¼ | 1,040 | 1,875 |
| 12¼ | 2,220 | 3,305 |
| 16¼ | 3,040 | 4,155 |
| 24¼ | 3,570 | 4,600 |

The 24½-hour compressive strengths for Examples 6 and 7 showed increases of 8% and 39%, respectively, over a blank containing no additive.

Table 2

| Hours | Blank | Compressive Strength, p.s.i. (average of 2 specimens) | |
|---|---|---|---|
| | | Example 8 (2% additive) | Example 9 (2% additive) |
| 9 | | 2,725 | 3,855 |
| 12 | | 3,440 | 4,395 |
| 15 | | 3,725 | 4,860 |
| 20 | | 4,190 | 5,200 |
| 21 | 1,500 | | |
| 25 | 2,500 | | |

Example 10

A concrete was prepared in the same manner and with the same proportions of materials as in Example 7 except that the cement used was Type 3-white Portland

| Ex. No. | Composition of Cement, percent by weight | | | | | | Wagner Surface Area, cm.²/g. | Additive | Water/Cement Ratio | Slump, Inches | Compressive Strength, Average of 3 specimens, p.s.i. | | | | | |
|---|---|---|---|---|---|---|---|---|---|---|---|---|---|---|---|---|
| | | | | | | | | | | | 40° F. | | 73° F. Cured in Fog Room | | 180° F. | |
| | C₃S | C₂S | C₃A | C₄AF | Alkali | SO₃ | | | | | 1 Day | 3 Days | 1 Day | 3 Days | 1 Day | 3 Days |
| 1 | 49.46 | 28.1 | 5.85 | 9.3 | .48 | 1.76 | 1,570 | None | .55 | 2½ | 145 | 2,711 | 1,186 | 2,464 | 2,663 | 3,738 |
| | | | | | | | | CaCl₂ | .55 | 2½ | 744 | 3,706 | 2,069 | 3,613 | 2,790 | 3,608 |
| | | | | | | | | Invention | .55 | 3.0 | 470 | 3,210 | 1,589 | 3,210 | 3,010 | 4,252 |
| 2 | 49.59 | 18.8 | 14.05 | 7.39 | .77 | 2.47 | 1,685 | None | .55 | 2¼ | 151 | 1,297 | 1,215 | 2,588 | 2,406 | 2,645 |
| | | | | | | | | CaCl₂ | .55 | 2¼ | 1,029 | 2,212 | 2,406 | 3,873 | 2,830 | 3,419 |
| | | | | | | | | Invention | .55 | 2½ | 483 | 1,469 | 1,615 | 3,170 | 2,573 | 3,329 |
| 3 | 49.34 | 22.3 | 8.63 | 10.15 | .74 | 2.17 | 1,570 | None | .56 | 3.0 | 342 | 1,387 | 1,029 | 2,485 | 2,552 | 3,452 |
| | | | | | | | | CaCl₂ | .56 | 2½ | 1,422 | 2,199 | 1,769 | 3,343 | 2,984 | 3,698 |
| | | | | | | | | Invention | .55 | 2½ | 522 | 1,485 | 1,050 | 2,764 | 3,021 | 3,599 |
| 4 | 45.53 | 31.5 | 5.54 | 8.79 | .65 | 2.12 | 1,575 | None | .55 | 2¼ | 163 | 788 | 780 | 2,202 | 2,342 | 2,836 |
| | | | | | | | | CaCl₂ | .55 | 3.0 | 703 | 1,668 | 1,748 | 3,277 | 2,509 | 3,302 |
| | | | | | | | | Invention | .54 | 3.0 | 732 | 1,838 | 1,398 | 2,942 | 2,636 | 3,873 |
| 5 | 51.29 | 30.2 | 11.12 | 9.18 | .62 | 2.55 | 1,700 | None | .55 | 2.0 | 926 | 1,841 | 1,196 | 2,913 | 2,554 | 3,504 |
| | | | | | | | | CaCl₂ | .54 | 2½ | 2,082 | 2,995 | 2,517 | 4,281 | 2,790 | 3,456 |
| | | | | | | | | Invention | .54 | 3.0 | 1,313 | 2,565 | 1,960 | 4,000 | 2,719 | 3,538 |

The concrete used in Examples 6–9 was a non-air entrained mix made with 94 pounds of Type 3 Portland cement, 128 pounds of sand, and 280 pounds of ⅜ inch gravel. The additive was prepared from 10% sodium nitrite and 90% calcium formate and was added in the specified percentages on a weight basis based on the cement. The concrete was mixed at 73° F. and the slump was within the range of about 0–½ inch. The additive in Example 8 was added as a liquid. After being poured into the mold, the concrete was compacted by a series of shocks. The compressive strengths of the concretes are set forth in the following tables. A blank cement. The compressive strengths of this material are set forth below.

| Hours | Compressive Strength, p.s.i. (average of 2 specimens) |
|---|---|
| 7 | 1,645 |
| 11 | 3,485 |
| 15 | 4,260 |
| 23 | 4,955 |

It will be noted that the additive of this invention provides early strength of concrete. At the elevated temperature, the additive produces compressive strengths which exceed that of calcium chloride in most cases. Compressive strength may be used not only to interpret the structural value or strength of the concrete but also as a means to measure the accelerated rate of setting.

The following examples show the compressive strengths and setting times of various concrete mixes in which one mix contained an additive of this invention and another contained calcium chloride. Both mixes are compared with one having no additive (referred to as blank). The mixes were similar to those described in Examples 1 to 5 and were composed of Portland cement, coarse aggregate and sand. The additive of this invention which was used in the following examples consisted of 97.8% by weight of calcium formate and 2.2% calcium chromate. Both the additive of this invention and the calcium chloride were incorporated into the respective mixes at a 2% level based on the weight of the cement.

| Example No. | Temp., °F. | Additive | Compressive strength, 7 days | Percent increase over blank, 28 days |
| --- | --- | --- | --- | --- |
| 11 | 40 | Invention | 30 | |
|    |    | CaCl₂     | 28 | |
| 12 | 55 | Invention | 32 | 17 |
|    |    | CaCl₂     | 33 | 15 |
| 13 | 55 | Invention | 26 | 6 |
|    |    | CaCl₂     | 21 | -6 |
| 14 | 55 | Invention | 27 | 12 |
|    |    | CaCl₂     | 37 | 10 |

| Example No. | Temp., °F. | Additive | Acceleration of set over blank | |
| --- | --- | --- | --- | --- |
|  |  |  | Initial (Hr.:Min.) | Final (Hr.:Min.) |
| 15 | 40 | Invention | 6:00 | 12:15 |
|    |    | CaCl₂     | 7:00 | 12:30 |
| 16 | 55 | Invention | 1:45 | 2:45 |
|    |    | CaCl₂     | 3:30 | 5:00 |
| 17 | 55 | Invention | 2:00 | 3:00 |
|    |    | CaCl₂     | 3:00 | 5:30 |

It can be seen from the above examples that the additive of this invention accelerates setting of a concrete which is markedly improved over a mix containing no accelerator and was substantially comparable to one containing the conventional calcium chloride. Or significance is the fact that the setting time is appreciably reduced without adversely influencing the strength of the concrete.

The corrosion of steel-reinforced concrete was tested electrochemically using the circuit and method described by H. Kaesche in Zement-Kalk-Gips, vol. 12, No. 7, pages 289–294, 1959. The circuit is essentially divided into two parts. The first part is comprised of the concrete electrode, voltage divider and platinum electrode which provides the current for corrosion. The second part is comprised of the concrete electrode, vacuum tube voltmeter and a saturated calomel reference electrode which is used to measure potential changes in the concrete electrode. (The vacuum tube voltmeter draws little current.)

When a potential is impressed on the concrete electrode there is no effect until the electrode potential of iron is exceeded. When this occurs, the following oxidation-reduction reactions take place:

At the concrete electrode—$Fe \rightarrow Fe^{++} + 2e^-$
At the platinum electrode—$2H_2O + 2e^- \rightarrow 2OH^- + H_2$ Concentration polarization, a well-known phenomenon, is the accumulation of electrolytic products at the electrode. Since the potential of an electrode is dependent on the concentration of ions around it, the accumulation of ferrous ion products within the concrete electrode impedes further electrolysis. The oxidation that is produced artificially in these tests is tantamount to rusting under field conditions.

Three cylindrical concrete electrodes were tested. Each was made of Portland cement and contained a reinforcing steel rod having a length of 22 cm. and a diameter of 0.7 cm. The concrete cylinder measured 16 cm. in length and 3 cm. in diameter into which the steel rod was inserted to within 1.5 cm. of the bottom. The end of the rod which was embedded in the concrete and the portion of the rod which appeared at the upper surface of the concrete were coated with wax. The portion of the rod which projected above the concrete cylinder as well as the portion lying between the embedded end and the surface-coated portion were free of wax.

The three electrodes which were tested were similar in all respects with the exception of the concrete mix. One concrete contained no accelerating additive (labeled "blank"), a second contained 2% by weight of the cement of calcium chloride, and the third contained 2% by weight of the cement of an additive of this invention comprised of 97.8% calcium formate and 2.2% sodium chromate. The electrodes were placed in a saturated calcium hydroxide solution and the corrosion test was carried out by applying an electromotive force of 0.7 volt to the concrete electrode. The corrosion activity was measured by the flow of current. If the current continued to flow after a given period of time, this was an indication that corrosion likewise continued. When the flow of current was substantially reduced, this was indication that minimal corrosion occurred. The results of the tests are reflected in Table 3:

TABLE 3

[Current density (milliamps/cm.²)]

| Time electromotive force applied (minutes) | 1 | 2 | 3 | 4 | 5 | 6 | 7 | 8 | 9 | 10 |
| --- | --- | --- | --- | --- | --- | --- | --- | --- | --- | --- |
| Blank | 26.2 | 21.8 | 13.2 | 8.8 | 8.6 | 8.2 | 6.6 | 5.8 | 4.8 | 4.8 |
| CaCl₂ | 81.0 | 71.2 | 65.8 | 57.0 | 48.2 | 48.2 | 41.6 | 41.6 | 40.6 | 40.6 |
| Invention | 10.8 | 13.2 | 10.8 | 6.6 | 8.8 | 6.6 | 8.8 | 4.4 | 4.4 | 4.4 |

As noted in the table, the current decayed with time in the case of the blank mix and the mix containing the additive of this invention due to oxide formation, and a protective coat continued to develop until very little current flow at 10 minutes. In the case of calcium chloride, however, the final current flow was quite high. It is believed that calcium chloride must in some way prevent the formation of a protective coating around the electrode and, as a result, iron continues to rust in its presence.

A similar corrosion test was run using an additive of this invention which was comprised of 9.78 grams of calcium formate and 0.32 gram of calcium benzoate. The additive was incorporated into the concrete mix at a 2% level based on the weight of the cement. The results of this test are shown in Table 4.

TABLE 4

| Time electromotive force applied (minutes): | Current density (milliamps/cm.²) |
|---|---|
| 1 | 19.7 |
| 2 | 13.1 |
| 3 | 11.0 |
| 4 | 8.8 |
| 5 | 6.6 |
| 6 | 6.6 |
| 7 | 6.6 |
| 8 | 6.6 |
| 9 | 6.6 |
| 10 | 6.6 |

It is noted that the presence of this additive appreciably reduced the current flow after 5 minutes and remained constant thereafter. Its use displayed far less corrosion activity than that of calcium chloride.

A different corrosion test was run using an additive of this invention which was comprised of 9.6 grams of calcium formate and 0.4 gram of sodium nitrite. The additive was incorporated into a mortar mix (ASTM C-109) with a water-cement ratio of 0.5. Three mixes were studied, one without an additive, one with 2% calcium chloride, and one with the aforedescribed additive of this invention. A galvanized iron strip of metal connected to an iron rod was placed into each mortar mix, which in this case was a zinc-iron cell in mortar. The vessels containing the electrodes were then placed in an oven for 6 days at 140° F. At the end of this time the electrodes were removed and inspected by visual observation. It was found that in the case of calcium chloride extensive corrosion had taken place even to the point of producing rust. With the additive of this invention, only small traces of zinc oxide were noted.

Since it is recognized in the art that metal under stress corrodes more readily than metal which is not stressed, the effectiveness of the additive of this invention in preventing corrosion was determined on concrete blocks containing prestressed steel.

The molds used for the concrete measured 3 inches by 4 inches by 24 inches. The concrete was prepared with Type 2 Portland cement according to ASTM designation C192–62T. Roebling K270, ⅜ inch diameter, high tensile, 7-wire strands were used. The tensioning force was applied by means of a center hole hydraulic jack of 60 tons total capacity with a travel of 6 inches. Deflection of strand was eliminated by applying an initial load of 500 pounds and using this load as a zero reference reading. Thereafter, full tension was applied and reading of forces on a gage were compared with elongation of strands. A prestressed force of 1335 p.s.i. was applied on each sample.

Three sets of test specimens were prepared, one containing no additive, one containing 2% calcium chloride by weight of cement, and one containing 2% of an additive consisting of 10% sodium nitrite and 90% calcium formate.

At the end of three weeks of room temperature curing, the wires were cut and the wires on one end were coated with wax. The prestressed concrete specimens were then placed in the same circuit as described above, and the corrosion activity was measured by the flow of current in the manner described above. The results of the tests are set forth in Table 5.

From the above data it can be readily seen that the novel additive of this invention retards the rate of corrosion of prestressed steel to a greater degree than even the blank which contains no additive or accelerator. This is quite unexpected in view of the art-recognized protective effects which concrete, without any set accelerator, provides for steel.

The novel additive of the present invention reduces the setting time and increases the early strength of the concrete and minimizes corrosion of the reinforcing or prestressed metal in concrete. Other properties of the concrete are not adversely affected by the additive of this invention. For example, the additive of this invention does not affect the volume change of cemented products. Two test series were run in accordance with ASTM C-465 to determine length change during hydration. After 90 days, it was found that a sample containing 2% by weight of the cement of an additive of this invention (97.8% calcium formate–2.2% calcium chromate) had contracted 0.0003 inch less than the blank sample.

What is claimed is:

1. An additive for Portland cement consisting of a major amount of calcium formate in admixture with a member selected from the group consisting of benzoic acid and the alkali metal, alkaline earth metal, and ammonium salts of chromic, benzoic, and nitrous acid.

2. An additive as defined in claim 1 wherein said calcium formate is present in the amount of 97.8% and the selected member is present in the amount of about 2.2%.

3. An additive as defined in claim 1 wherein said calcium formate is present in the amount of 90% and the selected member is present in the amount of about 10%.

4. An additive for Portland cement consisting of a major amount of calcium formate in admixture with up to about 5% by weight of a member selected from the group consisting of benzoic acid and the alkali metal, alkaline earth metal and ammonium salts of chromic acid, benzoic acid, and nitrous acid.

5. An additive according to claim 3 wherein the selected member is sodium chromate.

6. An additive according to claim 3 wherein the selected member is calcium chromate.

7. An additive according to claim 3 wherein the selected member is calcium benzoate.

8. An additive according to claim 3 wherein the selected member is sodium nitrite.

9. A cementing composition consisting essentially of Portland cement and between about 0.2% to 5% by weight of the cement of an additive consisting of a major amount of calcium formate with a member selected from the group consisting of benzoic acid and the alkali metal, alkaline earth metal and ammonium salts of chromic acid, benzoic acid, and nitrous acid.

10. The composition according to claim 9 wherein said additive contains 90% by weight of calcium formate and 10% by weight of the selected member.

11. The composition according to claim 9 wherein said additive contains 97.8% by weight of calcium formate and 2.2% by weight of the selected member.

12. A cementing composition consisting essentially of Portland cement and between about 0.2 to 5.0% by weight of the cement of an additive consisting of a major amount of calcium formate in admixture with up to about 5% by weight of a member selected from the group

TABLE 5

[Current density (milliamps/cm.²)]

| Time electromotive force applied (minutes) | 1 | 2 | 3 | 4 | 5 | 6 | 7 | 8 | 9 |
|---|---|---|---|---|---|---|---|---|---|
| Blank | 40.3 | 39.0 | 38.4 | 38.1 | 37.7 | 37.6 | 37.5 | 37.3 | 37 |
| CaCl₂ | 36.4 | 33 | 32.1 | 31.8 | 31.7 | 31.5 | 31.2 | 31.0 | 30.8 |
| Invention | 32.1 | 30 | 28.5 | 27.1 | 26.1 | 25.7 | 25.3 | 25.0 | 25 | consisting of benzoic acid and the alkali metal, alkaline earth metal, and ammonium salts of chromic acid, benzoic acid, and nitrous acid.

13. A composition according to claim 11 wherein selected member is sodium chromate.

14. A composition according to claim 11 wherein selected member is calcium chromate.

15. A composition according to claim 11 wherein selected member is calcium benzoate.

16. A composition according to claim 11 wherein selected member is sodium nitrite.

References Cited by the Examiner

UNITED STATES PATENTS

| | | | |
|---|---|---|---|
| 2,374,562 | 4/45 | Owens | 106—14 |
| 2,776,917 | 1/57 | Schnitzler et al. | 106—14 |
| 2,793,932 | 5/57 | Kahler et al. | 106—41 |
| 2,860,060 | 11/58 | Benedict et al. | 106—90 |
| 2,859,146 | 11/58 | Prost | 106—14 |
| 2,880,102 | 3/59 | Woodward et al. | 106—90 |

TOBIAS E. LEVOW, *Primary Examiner.*